US008699423B1

United States Patent
Anderson et al.

(10) Patent No.: US 8,699,423 B1
(45) Date of Patent: Apr. 15, 2014

(54) WIRELESS SLOT ALLOCATION

(75) Inventors: Howard Bishop Anderson, Ashburn, VA (US); Vijay Rudraraju, Herndon, VA (US); Esmail Hejazi Dinan, Herndon, VA (US); Hemanth Balaji Pawar, Herndon, VA (US); Daniel A. Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1029 days.

(21) Appl. No.: 12/139,308

(22) Filed: Jun. 13, 2008

(51) Int. Cl.
*H04W 4/00* (2009.01)
*H04B 7/00* (2006.01)

(52) U.S. Cl.
USPC ............................. 370/329; 370/310; 370/328

(58) Field of Classification Search
USPC ........................................................ 370/329
See application file for complete search history.

(56) References Cited

U.S. PATENT DOCUMENTS

| | | | |
|---|---|---|---|
| 7,039,039 B2 | 5/2006 | Cheong et al. | |
| 2002/0197999 A1* | 12/2002 | Wu et al. | 455/452 |
| 2005/0207374 A1* | 9/2005 | Petrovic et al. | 370/331 |
| 2006/0120321 A1* | 6/2006 | Gerkis et al. | 370/329 |
| 2006/0128347 A1* | 6/2006 | Piriyapoksombut et al. | 455/333 |
| 2006/0221991 A1 | 10/2006 | Bi et al. | |
| 2007/0058561 A1 | 3/2007 | Virgile | |
| 2008/0062914 A1* | 3/2008 | Olfat | 370/321 |
| 2009/0052408 A1* | 2/2009 | Kwak et al. | 370/336 |
| 2009/0058707 A1* | 3/2009 | Craze et al. | 341/176 |

OTHER PUBLICATIONS

Ericsson, "Technical Overview and Performance of HSPA and Mobile WiMAX," White Paper, Sep. 2007, pp. 1-28.
Majid Ghaderi, "Impact of Mobility and Wireless Channel on the Performance of Wireless Networks," A thesis presented to the University of Waterloo, 2006, pp. 1-140, Waterloo, Ontario, Canada.
Wimax Forum, "Mobile WiMAX—Part I: A Technical Overview and Performance Evaluation," Aug. 2006, pp. 1-53.

* cited by examiner

*Primary Examiner* — Shripal Khajuria (57) ABSTRACT

An indicator of throughput for one or more network elements is received. A plurality of slots are allocated to a plurality of devices that are operating using a plurality of combinations of modulation and coding. This allocation is based upon the indicator of throughput for the one or more network elements. An indicator of throughput for one or more network elements is received. A plurality of requests for wireless throughput are received from a plurality of wireless devices. Wireless throughput for each of the plurality of wireless devices is allocated based on a wireless throughput indicator associated with each of the plurality of wireless devices and the indicator of throughput.

19 Claims, 6 Drawing Sheets

WIRELESS SLOT ALLOCATION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued. All of these standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

OVERVIEW

A method of scheduling communication bandwidth is disclosed. An indicator of throughput for one or more network elements is received. A plurality of slots are allocated to a plurality of devices that are operating using a plurality of combinations of modulation and coding. This allocation is based upon the indicator of throughput for the one or more network elements.

An indicator of throughput for one or more network elements is received. A plurality of requests for wireless throughput are received from a plurality of wireless devices. Wireless throughput for each of the plurality of wireless devices is allocated based on a wireless throughput indicator associated with each of the plurality of wireless devices and the indicator of throughput.

An indicator of throughput for one or more network elements is determined. A plurality of slots to be used by a plurality of wireless devices is allocated such that a maximum throughput is not exceeded by the a total wireless throughput of the plurality of slots.

DETAILED DESCRIPTION

Figure 1:
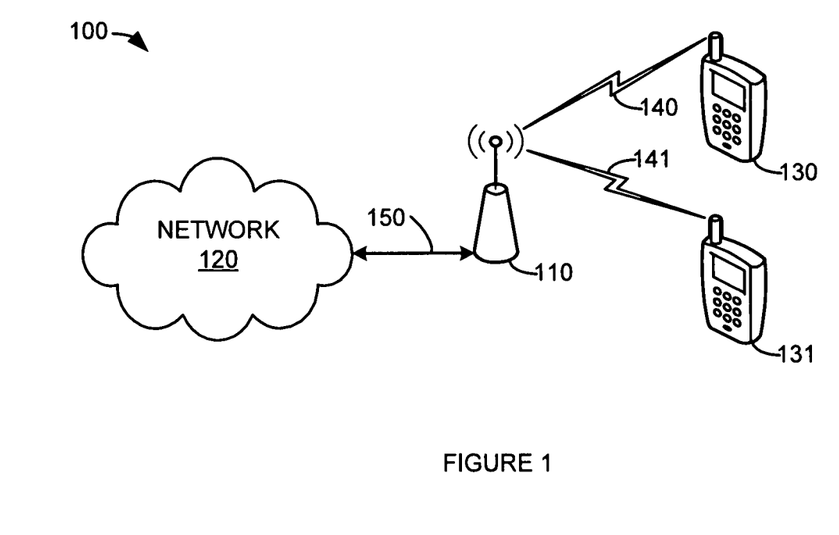
FIG. 1 is a block diagram illustrating a communication system.

FIG. 1 is a block diagram illustrating a communication system. In FIG. 1, communication system 100 comprises base station 110, network 120, wireless device 130, wireless device 131, wireless link 140, wireless link 141, and backhaul link 150.

Wireless device 130 and wireless device 131 may be operatively coupled to base station 110 by wireless links 140 and 141, respectively. Base station 110 is operatively coupled to network 120 via backhaul link 150. Thus, wireless devices 130 and 131 may be operatively coupled to network 120.

Wireless device 130 or wireless device 131 may be any device, system, combination of devices, or other such communication platform capable of communicating with base station 110 via wireless links 140 and 141, respectively. Wireless device 130 and wireless device 131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides the air interface to wireless device 130 and wireless device 131 and communication connectivity to network 120 via backhaul link 150. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 120 may comprise a computer, a network, or a collection of computers and networks that couple, link, or otherwise operatively provide wireless device 130 or wireless device 131 with communication service. It should be understood that network 120 may comprise secondary data networks. For example, network 120 may include a backhaul network, a local network, a long distance network, a packet network, or any combination thereof, as well as other types of networks. Network 120 may be or include an access service network (ASN), an access service network gateway (ASN-GW), wireless local access network access gateway (WAG), packet data gateway (PDG), mobile switching center (MSC) and packet data serving node (PDSN).

Wireless device 130 and wireless device 131 may establish communication sessions with base station 110 in order to receive communication services via network 120 and wireless links 140 and 141, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of data that can be exchanged via wireless links 140 and 141 depends upon air interface factors such as the number of wireless devices communicating via base station 110, interference, clutter, morphology, wireless device location, and wireless device mobility. To account for these air interface variations, a wireless standard may utilize multiple modulation and coding schemes. This allows wireless devices with poor air interface conditions to utilize a low bit rate modulation with a high redundancy coding scheme. Wireless devices with good air interface conditions may utilize higher bit rate modulation with a low or no redundancy coding scheme. Thus, wireless devices with good air interface conditions can exchange more data with base station 110 in a given time (or symbol) and frequency block than a wireless device with poor air interface conditions. A time and frequency block may be referred to as a slot.

For example, WiMAX specifies modulation and coding scheme combinations that include: QPSK and ½ CTC 6×; QPSK and ½ CTC 4×; QPSK and ½ CTC 2×; QPSK and ½ CTC 1×; 16 QAM and ½ CTC; 16 QAM and ¾ CTC; 64 QAM and ½ CTC; 64 QAM and ⅔ CTC; 64 QAM and ¾ CTC; and, 64 QAM and ⅚ CTC. With a 10 MHz system channel bandwidth, these modulation and coding schemes may provide communication capacity that ranges from approximately 18 to approximately 560 bits per slot. Thus, the amount of information conveyed to base station 110 over wireless links 140 and 141 depends upon the modulation and coding schemes that wireless device 130 and wireless device 131 are using, and the number of slots each wireless device 130 and 131 are allocated by base station 110.

The WiMAX wireless modulation and coding schemes and channel bandwidth discussed previously will be used to illustrate the following examples and embodiments. However, this is not intended to be limiting. Other wireless technologies may be used.

In an embodiment, backhaul link 150 may have a maximum throughput. In other words, backhaul link 150 may only be able to carry a maximum number of bits (or bytes) per second (e.g., 10 Mbits/s) Likewise, network 120, or an element of network 120 may have a maximum throughput. Base station 110 may measure the maximum throughput of backhaul link 150 or network 120. Base station 110 may use aspects of a communication protocol to discover the maximum throughput of backhaul link 150 or network 120. Base station 110 may receive a maximum throughput from another device. Base station 110 may be configured to only send a maximum throughput to backhaul link 150.

In an example, base station 110 may discover the maximum throughput of backhaul link 150 or network 120 by sending packets at successively higher rates until backhaul link 150 or network 120 starts dropping the sent packets. In another example, backhaul link 150, network 120, or an element of network 120 may inform base station 110 of the maximum throughput that base station 110 can send to network 120 via backhaul link 150. In another example, base station 110 may discover the maximum throughput of backhaul link 150 or network 120 by monitoring the transmission control protocol (TCP) congestion avoidance algorithm.

In an embodiment, the maximum throughput that can be carried by backhaul link 150 or network 120 may be less than the maximum throughput that can be carried over wireless links 140 and 141. For example, consider a case where backhaul link 150 or network 120 has a maximum throughput of 5 Mbps. Wireless devices 130 and 131 when operating using 16 QAM and ½ CTC may send as much as 9.41 Mbps to base station 110. Thus, the maximum throughput sent by wireless devices 130 and 131 exceeds the throughput capability of backhaul link 150 or network 120.

In an embodiment, base station 110 controls the amount of throughput that wireless device 130 or wireless device 131 may send via wireless links 140 and 141, respectively. This may be done by an air interface scheduler in base station 110 that allocates slots to be used by wireless device 130 or wireless device 131 to send data to base station 110. In an embodiment, base station 110 may only schedule slots such that the total traffic received from all the wireless devices 130 and 131 is less than or equal to the throughput capability of backhaul link 150, or network 120, and leave the remaining slots unallocated. Base station 110 may determine the total traffic that may be received from wireless devices 130 and 131 by associating the modulation and coding scheme that each wireless device 130 and 131 is using with a maximum throughput.

For example, consider a case where wireless device 130 is using 16 QAM and ¾ CTC and the maximum throughput of backhaul link 150, or network 120, is 5 Mbps. Using WiMAX as an example, the maximum throughput that wireless device 130 may send to base station 110 using this modulation and coding scheme approximately 14.11 Mbps. Thus, rather than allocate all 210 uplink slots to wireless device 130, base station 110 may only allocate 74 slots to wireless device 130 and no slots to any other devices. This will result in wireless device 130 only being able to send an amount of throughput that can be carried by backhaul link 150 or network 120. (E.g., [74/210]*14.11 Mbps=4.97 Mbps which is less than or equal to 5 Mbps.) The unallocated slots will remain unused thus reducing interference.

In an embodiment, base station 110 may allocate all (or nearly all) of the available slots to devices using lower throughput modulation and coding schemes such that the total traffic received by base station 110 does not exceed the maximum throughput capability of backhaul link 150 or network 120. To illustrate, consider a 10 MHz channel WiMAX system where: (1) wireless device 130 is using QPSK and ¾ CTC; (2) wireless device 131 is using QPSK and ½ CTC 1×; (3) a third wireless device (not shown) is using 16 QAM and ½ CTC; and, (4) the maximum throughput of backhaul link 150, or network 120, is 5 Mbps. In this example, the maximum throughput for wireless device 130 may be as much as 7.06 Mbps. The maximum throughput for wireless device 131 may be as much as 4.7 Mbps. The maximum throughput for the third wireless device may be as much as 9.41 Mbps. Thus, if either wireless device 130 or the third wireless device is allocated too many slots, the maximum throughput capability of backhaul link 150 or network 120 will be exceeded.

In an embodiment, base station 110 favors wireless devices operating at lower throughput rate modulation and coding schemes in the allocation of slots. In another embodiment, base station 110 favors wireless devices operating in poor RF conditions in the allocation of slots. Thus, in the previous example, base station 110 may allocate 183 slots to wireless device 131, 27 slots to wireless device 130, and no slots to the third wireless device. This results in a total received throughput that does not exceed, or at least not greatly exceed, the 5 Mbps maximum throughput of backhaul link 150 or network 120. (E.g., [183/210]*4.7 Mbps+[27/210]*7.06 Mbps=5 Mbps.)

By giving preference to wireless devices in bad RF signal conditions, the coverage area of base station 110 is improved. This also allocates more of the available air interface resources to wireless devices in bad RF conditions. An indicator of RF conditions can be measured and associated with each device. Because the modulation and coding scheme associated with a device is correlated to the RF conditions, the RF conditions may be determined from the modulation and coding scheme associated with a device. Throughput for devices with better RF signal conditions may be carried at a later time.

Figure 2:
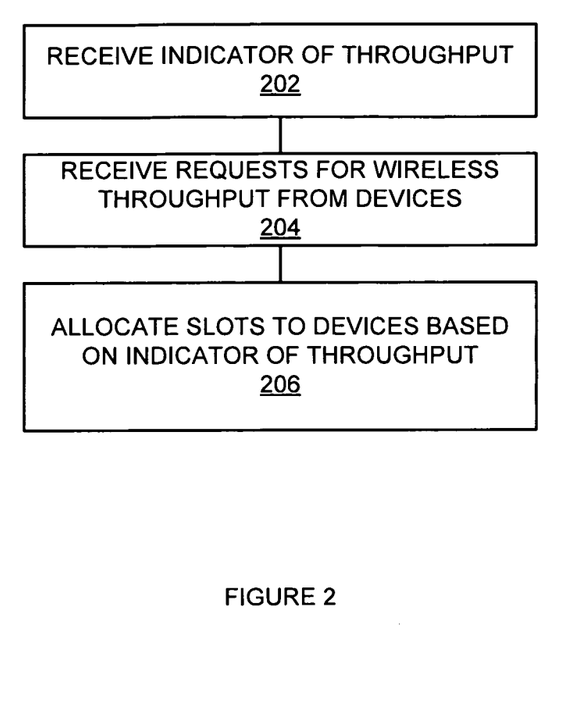
FIG. 2 is a flowchart illustrating a method of allocating communication bandwidth.

FIG. 2 is a flowchart illustrating a method of allocating communication bandwidth. The steps illustrated in FIG. 2 may be performed by one or more elements of communication system 100.

An indicator of throughput is received (202). For example, base station 110 may receive an indicator of the maximum throughput of backhaul link 150. In another example, base station 110 may receive an indicator of the maximum throughput of one or more elements of network 120. In another example, base station 110 may receive an indicator of the congestion of network 120.

Requests for wireless throughput are received from devices (204). For example, base station 110 may receive requests from wireless devices 130 and 131 for uplink bandwidth. Base station 110 may also receive requests from other devices for uplink bandwidth.

Slots are allocated to devices based on the indicator of throughput (206). For example, base station 110 may allocate uplink slots to wireless device 130 or wireless device 131 such that the total uplink throughput allocated does not exceed the indicator of throughput. In another example, base station 110 may allocate uplink slots such that a wireless device operating in poor RF conditions is given priority in the allocation of slots. In another example base station 110 may allocate slots such that a wireless device operating using a low throughput modulation and coding scheme combination is given priority in the allocation of slots over a wireless device operating using a higher throughput modulation and coding scheme combination.

Figure 3:
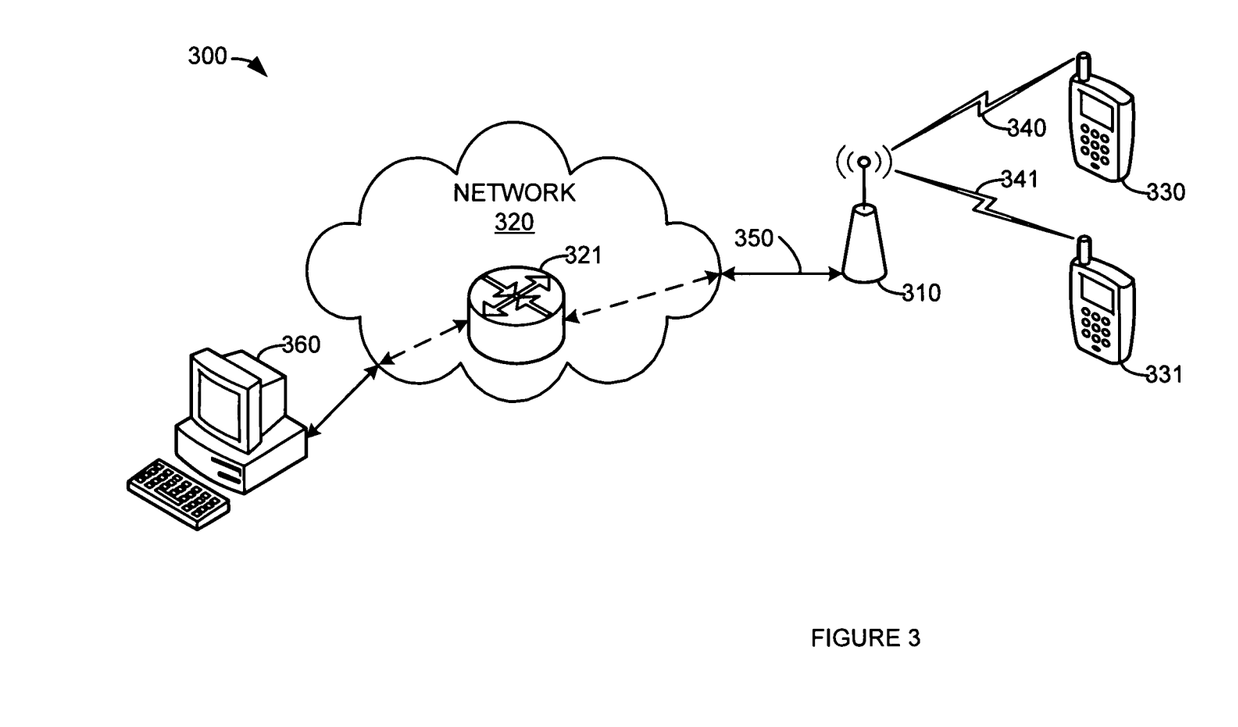
FIG. 3 is a block diagram illustrating a communication system.

FIG. 3 is a block diagram illustrating a communication system. In FIG. 3, communication system 300 comprises base station 310, network 320, wireless device 330, wireless device 331, wireless link 340, wireless link 341, backhaul link 350, and computer system 360. Network 320 includes network element 321.

Wireless device 330 and wireless device 331 may be operatively coupled to base station 310 by wireless links 340 and 341, respectively. Base station 310 is operatively coupled to network 320 via backhaul link 350. Computer system 360 is operatively coupled to network 320. Thus, wireless device 330 and wireless device 331 may be operatively coupled to computer system 360 via network 320, and network element 321 in particular.

Wireless device 330 or wireless device 331 may be any device, system, combination of devices, or other such communication platform capable of communicating with base station 310 via wireless links 340 and 341, respectively. Wireless device 330 and wireless device 331 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 310 via wireless links. Other types of communication platforms are possible.

Base station 310 may be any wireless system that provides a WiMAX specified air interface to wireless devices 330 and 331 and communication connectivity to computer system 360 via network 320 and backhaul link 350. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 320 and network element 321 may comprise a computer, a network, or a collection of computers and networks that couple, link, or otherwise operatively provide wireless devices 330 or 331 with communication service. It should be understood that network 320 may comprise secondary data networks. For example, network 320 may include a backhaul network, a local network, a long distance network, a packet network, or any combination thereof, as well as other types of networks. Network 320 may be or include an ASN, an ASN-GW, a WAG, a packet data gateway PDG, an MSC, or a PDSN.

Wireless device 330 and wireless device 331 may establish communication sessions with base station 310 in order to receive communication services via network 320 and wireless links 340 and 341, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of data that can be exchanged via wireless links 340 and 341 depends upon air interface factors such as the number of wireless devices communicating via base station 310, interference, clutter, morphology, wireless device location, and wireless device mobility. To account for these air interface variations, the WiMAX standard specifies several modulation and coding schemes. This allows wireless devices with poor air interface conditions to utilize a low bit rate modulation with a high redundancy coding schemes. Wireless devices with good air interface conditions may utilize higher bit rate modulation with a low or no redundancy coding scheme. Thus, wireless devices with good air interface conditions can exchange more data with base station 310 in a given time and frequency block (e.g., slot) than a wireless device with poor air interface conditions could in the same time and frequency block.

The amount of information conveyed over wireless links 340 and 341 depends upon the modulation and coding scheme that wireless devices 330 and 331 are using, and the number of slots each wireless device 330 and 331 is allocated by base station 310.

In an embodiment, backhaul link 350 may have a maximum throughput. In other words, backhaul link 350 may only be able to carry a maximum number of bits (or bytes) per second (e.g., 10 Mbits/s) Likewise, network 320, or network element 321 may have a maximum throughput. This maximum throughput may be based on quality of service (QoS) indicators. The maximum throughput may also be based on differentiated services (e.g., DiffServ) indicators.

The maximum throughput may be set or based on policies set by network 320 or network element 321. For example, a deep packet inspection policy server may implement a set of policies that determine the maximum throughput. In an embodiment, network element 321 may be a policy server. The maximum throughput set by the policy server may be communicated to base station 310. The maximum throughput may be set for only certain types of traffic by the policy server. However, depending upon the mix of traffic being carried by backhaul link 350, network 320, or network element 321 these limits on certain types of traffic may determine the overall maximum throughput.

Base station 310 may measure the maximum throughput of backhaul link 350, network 320, or network element 321. Base station 310 may use aspects of a communication protocol to discover the maximum throughput of backhaul link 350, network 320, or network element 321.

For example, base station 310 may discover the maximum throughput of network element 321 by sending packets to computer system 360 at successively higher rates until network element 321 starts dropping the sent packets. In another example, network element 321 may inform base station 310 of the maximum throughput that base station 310 can send through network element 321. In another example, base station 310 may discover the maximum throughput of network element 321 by monitoring the transmission control protocol (TCP) congestion avoidance algorithm.

In an embodiment, the maximum throughput that can be carried by network element 321 may be less than the maximum throughput that can be carried over wireless links 340 and 341. In an embodiment, base station 310 controls the amount of throughput that wireless device 330 or wireless device 331 may send via wireless links 340 and 341, respectively. This may be done by an air interface scheduler in base station 310 that allocates slots to be used by wireless device 330 or wireless device 331 to send data to base station 310. In an embodiment, base station 310 may only schedule slots such that the total traffic received from all the wireless device 330 and 331 is less than or equal to the throughput capability of network element 321 and leave the remaining slots unallocated. Base station 310 may determine the total traffic that may be received from wireless devices 330 and 331 by associating the modulation and coding scheme that each wireless device 330 and 331 is using with a respective maximum throughput.

For example, consider a case where wireless device 330 is using 16 QAM and ¾ CTC and the maximum throughput of network element 321 is 5 Mbps. The maximum throughput that wireless device 330 may send to base station 310 using this modulation and coding scheme approximately 14.11 Mbps. Thus, rather than allocate all 210 uplink slots to wireless device 330, base station 310 may only allocate 74 slots to wireless device 330 and no slots to any other devices. This will result in wireless device 330 only sending an amount of throughput that can be carried by network element 321. (E.g., [74/210]*14.11 Mbps=4.97 Mbps which is less than or equal to 5 Mbps.) The unallocated slots will remain unused thus reducing interference.

In an embodiment, base station 310 may allocate all (or nearly all) of the 210 available slots to devices using lower throughput modulation and coding schemes such that the total traffic received by base station 310 does not exceed the maximum throughput capability of network element 321. To illustrate, consider a system where: (1) wireless device 330 is using QPSK and ¾ CTC; (2) wireless device 331 is using QPSK and ½ CTC 1×; (3) a third wireless device (not shown) is using 16 QAM and ½ CTC; and, (4) the maximum throughput of network element 321 is 5 Mbps. In this example, the maximum throughput for wireless device 330 may be as much as 7.06 Mbps. The maximum throughput for wireless device 331 may be as much as 4.7 Mbps. The maximum throughput for the third wireless device may be as much as 9.41 Mbps. Thus, if either wireless device 330 or the third wireless device is allocated too many slots, the maximum throughput capability of network element 321 will be exceeded.

In an embodiment, base station 310 favors wireless devices operating at lower throughput rate modulation and coding schemes in the allocation of slots. In another embodiment, base station 310 favors wireless devices operating in poor RF conditions in the allocation of slots. Thus, in the previous example, base station 310 may allocate 183 slots to wireless device 131, 27 slots to wireless device 130, and no slots to the third wireless device. This results in a total received throughput that does not exceed the 5 Mbps maximum throughput of backhaul link 150 or network 120. (E.g., [183/210]*4.7 Mbps+[27/210]*7.06 Mbps=5 Mbps.)

By giving preference to wireless devices in bad RF signal conditions, the coverage area of base station 310 is improved. This also allocates more of the available air interface resources to wireless devices in bad RF conditions. The RF conditions can be measured and associated with a device. Because the modulation and coding scheme associated with a device is correlated to the RF conditions, the RF conditions may be determined from the modulation and coding scheme associated with a device. Throughput for devices with better RF signal conditions may be carried at a later time.

Figure 4:
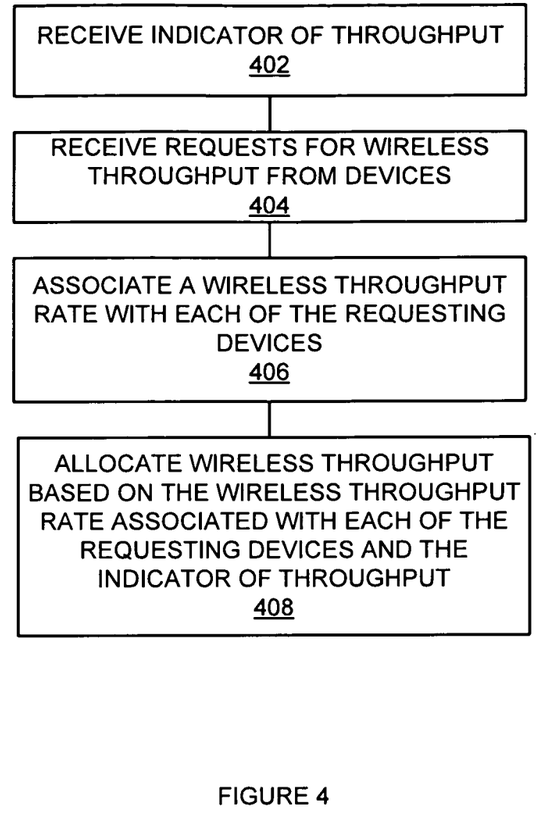
FIG. 4 is a flowchart illustrating a method of allocating wireless throughput.

FIG. 4 is a flowchart illustrating a method of allocating wireless throughput. The steps illustrated in FIG. 4 may be performed by one or more elements of communication system 100 or communication system 300.

An indicator of throughput is received (402). For example, base station 310 may receive an indicator of the maximum throughput of network element 321. In another example, base station 310 may receive an indicator of the maximum throughput of backhaul link 350. In another example, base station 310 may receive an indicator of the congestion of network 320. In another example, base station 310 may receive an indicator from computer system 360 that network element 321 is dropping packets.

Requests for wireless throughput are received from devices (404). For example, base station 310 may receive requests from wireless devices 330 and 331 for uplink bandwidth. Base station 310 may also receive requests from other wireless devices for uplink bandwidth.

A wireless throughput rate is associated with each of the requesting devices (406). For example, if wireless device 330 is using QPSK and ¾ CTC, base station 310 may associate a throughput rate of 33.6 kbps per slot (kbps/slot). (E.g., a maximum throughput for QPSK and ¾ CTC of 7.06 Mbps divided by 210 slots is approximately 33.6 kbps per slot). In another example, if wireless device 330 is using QPSK and ½ CTC 4×, base station 310 may associate a throughput rate of 5.6 kbps/slot. (E.g., a maximum throughput of 1.18 Mbps divided by 210 slots is approximately 5.6 kbps/slot.)

Wireless throughput is allocated based on the wireless throughput rate associated with each of the requesting devices and the indicator of throughput (408). For example, base station 310 may allocate slots to wireless device 330 and wireless device 331 based on the throughput per slot numbers of 33.6 kbps/slot and 5.6 kbps/slot, respectively, and the maximum throughput for network element 321 of 5 Mbps. In an embodiment, the allocation of slots may be made to favor devices that have lower wireless throughput rates. For example, base station 110 may allocate all 210 of the slots to wireless device 331 because this does not exceed the maximum throughput of network element 321. (E.g., 1.18 Mbps is less than 5 Mbps.)

Figure 5:
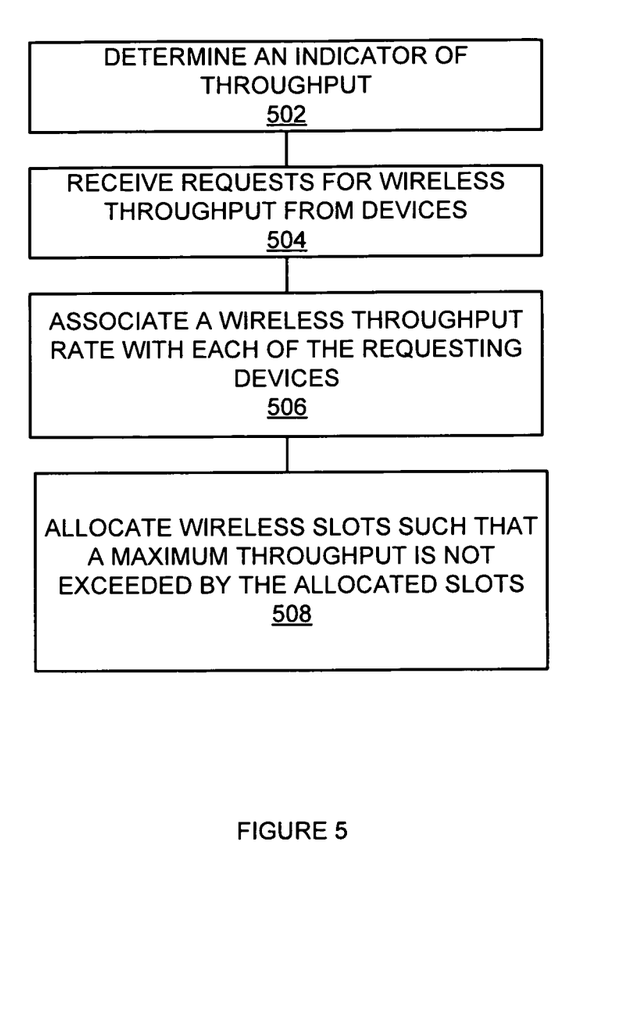
FIG. 5 is a flowchart illustrating a method of allocating wireless slots.

FIG. 5 is a flowchart illustrating a method of allocating wireless slots. The steps illustrated in FIG. 5 may be performed by one or more elements of communication system 100 or communication system 300.

An indicator of throughput is determined (502). For example, network element 321 may determine an indicator of the maximum throughput of network element 321. In another example, base station 310 may determine an indicator of the maximum throughput of backhaul link 350. In another example, base station 310 may monitor TCP/IP packets to determine an indicator of the congestion of network 320. In another example, computer system 360 may determine that network element 321 is dropping packets at a certain throughput rate.

Requests for wireless throughput are received from devices (504). For example, base station 310 may receive requests from wireless devices 330 and 331 for uplink bandwidth. Base station 310 may also receive requests from other wireless devices for uplink bandwidth.

A wireless throughput rate is associated with each of the requesting devices (506). For example, if wireless device 330 is using QPSK and ¾ CTC, base station 310 may associate a throughput rate of 168 bits per slot (bits/slot). (E.g., a maximum throughput for QPSK and ¾ CTC of 7.06 Mbps divided by 200 frames per second and 210 slots is approximately 168 bits per slot). In another example, if wireless device 330 is using QPSK and ½ CTC 4×, base station 310 may associate a throughput rate of 28 bits per slot. (E.g., a maximum throughput of 1.18 Mbps divided by 200 frames per second and 210 slots is approximately 28 bits per slot.)

Wireless slots are allocated such that a maximum throughput is not exceeded by the allocated slots (508). For example, base station 310 may allocate slots to wireless device 330 and wireless device 331 such that the maximum throughput of network element 321 is not exceeded. Base station 310 may calculate the total throughput allocated to wireless device 330 and wireless device 331 based on the throughput rates associated with each device in step 506.

In another example, base station 310 may favor wireless device 331 over wireless device 330 in the allocation of slots because wireless device 331 is associated with a lower throughput rate. In another example, base station 310 may allocate slots to wireless device 331 until wireless device 331's bandwidth request is fulfilled. Base station 310 may then allocate slots to wireless device 330 until a maximum throughput (determined in step 502) is almost exceeded.

The methods, systems, devices, network elements, and computers, described herein may be implemented with, contain, or be executed by one or more computer systems. The methods described above may also be stored on a computer readable medium. Many of the elements of communication system 100 and communication system 300 may be, comprise, or include computers systems. This includes, but is not limited to: base station 110; network 120; wireless device 130; wireless device 131; backhaul link 150; base station 310; network 320; network element 321; wireless device 330; wireless device 331; backhaul link 350; and, computer system 360.

Figure 6:
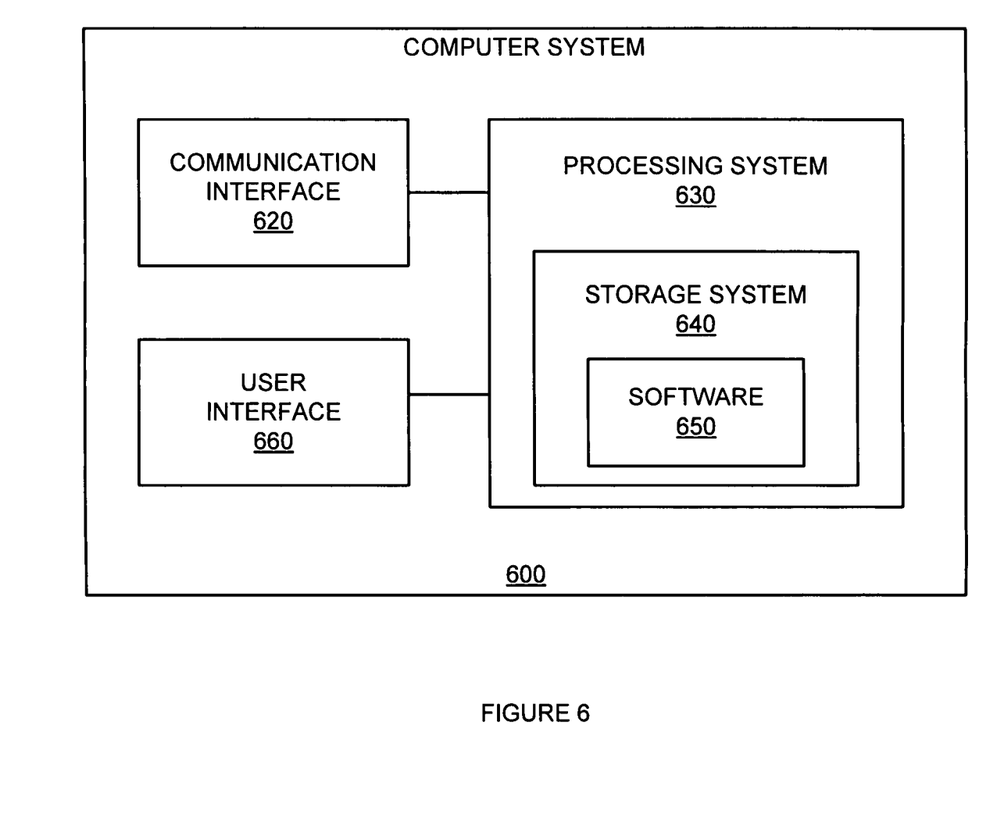
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication bandwidth, comprising:
   receiving, at a base station, an indicator of backhaul link throughput for one or more network elements operatively coupled to a network, where the base station provides communication connectivity between a first plurality of devices configured to operate using a plurality of combinations of modulation and coding and the network;
   receiving, at the base station, a request for wireless throughput from each of a second plurality of devices, wherein the second plurality of devices are a subset of the first plurality of devices;
   determining, at the base station, a wireless throughput rate for each of the second plurality of devices requesting wireless throughput, wherein the wireless throughput rate is based on modulation and coding associated with each of the second plurality of devices; and
   allocating, at the base station, a plurality of slots to the first plurality of devices based upon the indicator of backhaul link throughput for the one or more network elements and a combined wireless throughput rate of all the second plurality of devices, wherein slot allocation priority is given to devices that have a lower wireless throughput rate.

2. The method of claim 1,
   wherein the combined wireless throughput rate of all the second plurality of devices a exceeds a throughput indicated by the indicator of backhaul link throughput.

3. The method of claim 2, wherein the throughput indicated by the indicator of backhaul link throughput is based on at least one of a set network policy and dynamic determination of the maximum throughput.

4. The method of claim 1, further comprising:
   determining, at the base station, a signal quality indicator associated with each of the second plurality of devices, wherein allocating the plurality of slots is further based on the signal quality indicator.

5. The method of claim 1, wherein the indicator of backhaul link throughput is based on sending packets from the base station to the network at successively higher rates until a predetermined number of sent packets are dropped.

6. The method of claim 1, wherein the indicator of backhaul link throughput is based on monitoring at the base station a transmission control protocol (TCP) congestion avoidance algorithm.

7. A method of allocating wireless throughput, comprising:
receiving, at a base station, an indicator of backhaul link throughput for one or more network elements operatively coupled to a network, where the base station provides communication connectivity between a plurality of wireless devices and the network;
receiving, at the base station, a plurality of requests for wireless throughput from the plurality of wireless devices;
determining, at the base station, a wireless throughput rate for the plurality of wireless devices, wherein the wireless throughput rate is based on modulation and coding associated with each of the wireless devices; and,
allocating, at the base station, wireless throughput for each of the plurality of wireless devices based on a combined wireless throughput rate of all the plurality of wireless devices a and the indicator of backhaul link throughput, wherein the combined wireless throughput rate is based on a combination of modulation and coding associated with each of the wireless devices and wireless throughput allocation priority is given to wireless devices within the plurality of wireless devices that have a lower wireless throughput rate.

8. The method of claim 7, wherein the wireless throughput allocated for all of the plurality of wireless devices satisfies a criteria based on the indicator of backhaul link throughput.

9. The method of claim 8, wherein the wireless throughput is allocated such that the total wireless throughput allocated for the plurality of devices does not exceed a maximum throughput based on the indicator of backhaul link throughput.

10. The method of claim 7, wherein the wireless throughput allocated for at least one of the plurality of wireless devices satisfies a criteria based on the indicator of backhaul link throughput.

11. The method of claim 10, wherein the wireless throughput is allocated such that the wireless throughput allocated to one of the plurality of devices does not exceed a maximum throughput based on the indicator of backhaul link throughput.

12. The method of claim 7, further comprising:
determining, at the base station, a signal quality indicator associated with each of the plurality of wireless devices;
wherein allocating the plurality of slots is further based on each signal quality indicator.

13. The method of claim 7, wherein the backhaul link throughput is based on sending packets from the base station to the network at successively higher rates until a predetermined number of sent packets are dropped.

14. The method of claim 7, wherein the backhaul link throughput is based on monitoring at the base station a transmission control protocol (TCP) congestion avoidance algorithm.

15. A method of scheduling wireless slots, comprising:
determining, at a base station, an indicator of network throughput for one or more network elements operatively coupled to a network, where the base station provides communication connectivity between a plurality of wireless devices configured to operate using a plurality of combinations of modulation and coding and the network;
receiving, at the base station, a plurality of requests for wireless throughput from the plurality of the wireless devices;
determining, at the base station, a wireless throughput rate for the plurality of wireless devices, wherein the wireless throughput rate is based on modulation and coding associated with each of the wireless devices; and,
scheduling, at the base station, a plurality of slots to be used by the plurality of wireless devices by scheduling the plurality of slots based on a combined wireless throughput rate of all the plurality of wireless devices and the indicator of network throughput, wherein the combined wireless throughput rate is based on the combination of modulation and coding associated with each of the wireless devices such that a maximum throughput based on the indicator of network throughput is not exceeded by a total wireless throughput of the plurality of slots and the plurality of slots are scheduled based on priority given to wireless devices within the plurality of wireless devices that have a lower wireless throughput rate.

16. The method of claim 15, further comprising:
associating at least one of the plurality of wireless devices with the indicator of network throughput, wherein the step of scheduling is also based on the indicator of network throughput.

17. The method of claim 15, wherein the step of scheduling schedules slots for the at least one of the plurality of wireless devices such that a maximum network throughput is not exceeded by the wireless throughput associated with slots scheduled for the at least one of the plurality of wireless devices, wherein the maximum network throughput is based on the indicator of network throughput.

18. The method of claim 15, wherein the backhaul link throughput is based on sending packets from the base station to the network at successively higher rates until a predetermined number of sent packets are dropped.

19. The method of claim 15, wherein the backhaul link throughput is based on monitoring at the base station a transmission control protocol (TCP) congestion avoidance algorithm.

* * * * *